United States Patent
Jowers et al.

(10) Patent No.: US 8,622,178 B2
(45) Date of Patent: Jan. 7, 2014

(54) IN-HUB BRAKING SYSTEM FOR MANUAL WHEELCHAIRS

(76) Inventors: Jonathan E. Jowers, Wilkes Barre, PA (US); Stephen H. Sprigle, Marietta, GA (US)

(*) Notice: Subject to any disclaimer, the term of this patent is extended or adjusted under 35 U.S.C. 154(b) by 106 days.

(21) Appl. No.: 13/157,757

(22) Filed: Jun. 10, 2011

(65) Prior Publication Data

US 2011/0304195 A1   Dec. 15, 2011

Related U.S. Application Data

(60) Provisional application No. 61/353,399, filed on Jun. 10, 2010.

(51) Int. Cl.
*B62B 5/04* (2006.01)

(52) U.S. Cl.
USPC ........... 188/2 F; 188/78; 188/325; 280/242.1; 280/250.1

(58) Field of Classification Search
USPC ................. 188/2 F, 78, 82.1, 82.2, 82.3, 325; 280/242.1, 250.1, 304.1, 647
See application file for complete search history.

(56) References Cited

U.S. PATENT DOCUMENTS

| | | | |
|---|---|---|---|
| 3,897,857 A | 8/1975 | Rodaway | |
| 4,045,047 A * | 8/1977 | Buckley | 280/250.1 |
| 4,204,588 A | 5/1980 | Kawecki | |
| 4,320,818 A * | 3/1982 | Knoche | 188/2 F |
| 4,456,102 A * | 6/1984 | Peitz | 188/331 |
| 4,462,605 A | 7/1984 | Morgan et al. | |
| 4,537,415 A | 8/1985 | Delahoussaye et al. | |
| 4,538,825 A * | 9/1985 | Delahoussaye et al. | 280/250.1 |
| 4,987,978 A | 1/1991 | Jungersen | |
| 5,197,750 A * | 3/1993 | DiGeorge | 280/250.1 |
| 5,263,729 A | 11/1993 | Watwood et al. | |
| 5,280,938 A | 1/1994 | Berry | |
| 5,492,355 A | 2/1996 | Berry | |
| 5,577,748 A * | 11/1996 | Dombrowski et al. | 280/244 |
| 5,657,836 A | 8/1997 | BeVier | |
| 5,667,236 A | 9/1997 | Murphy | |
| 6,422,362 B1 * | 7/2002 | Schmidt et al. | 188/339 |
| 6,851,522 B2 | 2/2005 | Wren | |
| 7,124,858 B2 * | 10/2006 | Ikegami et al. | 188/2 F |
| 7,252,300 B2 | 8/2007 | Hargroder | |
| 8,109,529 B2 * | 2/2012 | Rand et al. | 280/244 |

* cited by examiner

*Primary Examiner* — Thomas J Williams
*Assistant Examiner* — Mariano Sy
(74) *Attorney, Agent, or Firm* — Thedford I. Hitaffer; Hitaffer & Hitaffer, PLLC (57) ABSTRACT

An in-hub braking system for a wheelchair comprises a brake shell fixed against rotation movement in relation to a wheelchair frame. A wheelchair drive wheel having a hub supporting a braking system is supported for rotational movement in relation to the brake shell. A lever is operatively connected to the braking system for activating that braking system to cause the braking system to frictionally engage the brake shell. A push rim, which when urged forward, rotates the drive wheel in a forward direction to propel the wheelchair in a forward direction. When urged rearward together with the drive wheel, the push rim rotates with the drive wheel in a rearward direction to propel the wheelchair in a rearward direction. The push rim is operatively connected to the lever so that the push rim, which when urged rearward independent of the drive wheel, operates the lever to activate the braking system to frictionally engage the brake shell.

1 Claim, 8 Drawing Sheets

IN-HUB BRAKING SYSTEM FOR MANUAL WHEELCHAIRS

CROSS-REFERENCE TO RELATED APPLICATIONS

This application claims the benefit of U.S. Provisional Application No. 61/353,399, filed Jun. 10, 2010, the disclosure of which is incorporated herein by reference.

BACKGROUND OF THE INVENTION

This invention relates in general to wheelchairs, and more particularly to braking systems for wheelchairs.

Braking for users of manual wheelchairs can be a challenging task, especially for those with limited mobility/dexterity or while traveling downhill. Descending ramps and sloped sidewalks may present a significant barrier to independent and safe mobility for manual wheelchair users. The most common technique to retard speed is the use of friction on the wheels, either at the tires or push rims.

For persons with poor hand strength and/or sensation, braking action by use of friction on the wheels can be difficult or impossible. A wheelchair user will apply friction to the tires or push-rims with either a bare or gloved hand. Bare hands can be burned from high friction rims during braking, while gloves can reduce sensation for propulsion.

Some users will lean forward to engage the wheel locks against the drive wheel tire to slow down. Wheel locks are intended to provide a stationary engagement once the wheelchair has stopped, and to prevent movement. Many devices are either some form of caliper to grasp the rim of the wheel or a friction assembly contacting the tire surface. Most require the user to remove his/her hands from the push-rim for application of the brakes.

The application of brakes using a wheel lock is undesirable for several reasons. First, it is an incorrect use of a device, akin to slowing a car by using a parking brake. Second, it puts the user's center of gravity far forward of the base of support provided by the wheelchair, potentially causing the user to fall out of the wheelchair. There are several devices currently available that allow the user to apply braking forces through external mechanical measures, but the majority of these devices require the user to remove their hands from the push-rim to apply the brakes.

The inability to control the wheelchair speed places the user at risk of collisions, falls and/or tips. The majority of tips and falls occur in the forward direction, consistent with running into an object at too high of speed.

A need exists for a braking system for manual wheelchair users who do not have full upper extremity function.

SUMMARY OF THE INVENTION

This invention relates to a user-centered design approach, wherein a "hand-on" brake allows users to maintain control of their wheelchair, while maintaining direct contact with the push rims.

An in-hub braking system for a wheelchair comprises a brake shell fixed against rotation movement in relation to a wheelchair frame. A wheelchair drive wheel having a hub supporting a braking system is supported for rotational movement in relation to the brake shell. A lever is operatively connected to the braking system for activating that braking system to cause the braking system to frictionally engage the brake shell. A push rim, which when urged forward, rotates the drive wheel in a forward direction to propel the wheelchair in a forward direction. When urged rearward together with the drive wheel, the push rim rotates with the drive wheel in a rearward direction to propel the wheelchair in a rearward direction. The push rim is operatively connected to the lever so that the push rim, which when urged rearward independent of the drive wheel, operates the lever to activate the braking system to frictionally engage the brake shell.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
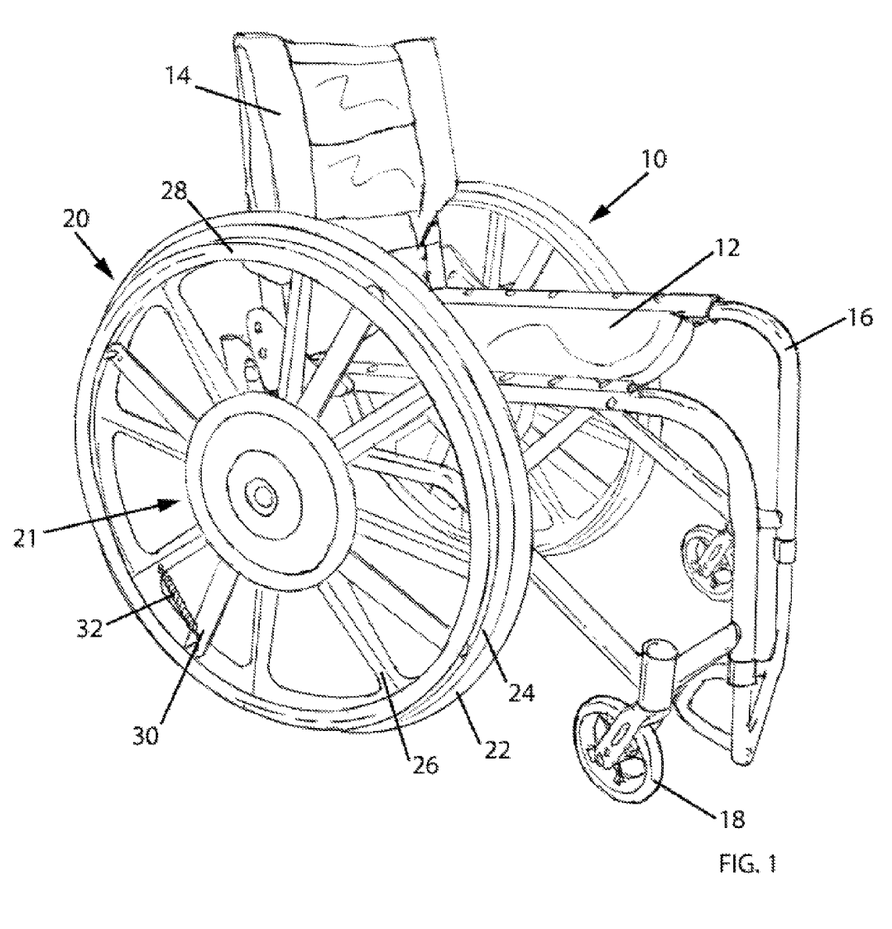
FIG. 1 is a perspective of a wheelchair with an in-hub braking system.

Referring now to the drawings, wherein like numerals designate like components throughout all of the several figures, there is illustrated in FIG. 1 a manual wheelchair, generally indicated at 10, comprising a seat sling 12 and seat back 14 affixed or supported in relation to a frame 16, which may be in the form of a folding frame. The frame 16 is supported in relation to a supporting surface (e.g., the floor or ground) by casters 18 and drive wheels 20, which are respectively mounted in relation to front and rear of the frame 16 on the right and left sides of the frame 16. The drive wheels 20 on each side of the frame 16 have common parts. As a consequence, the description of the drive wheel 20 herein below applies to each of the drive wheels 20.

Figure 2:
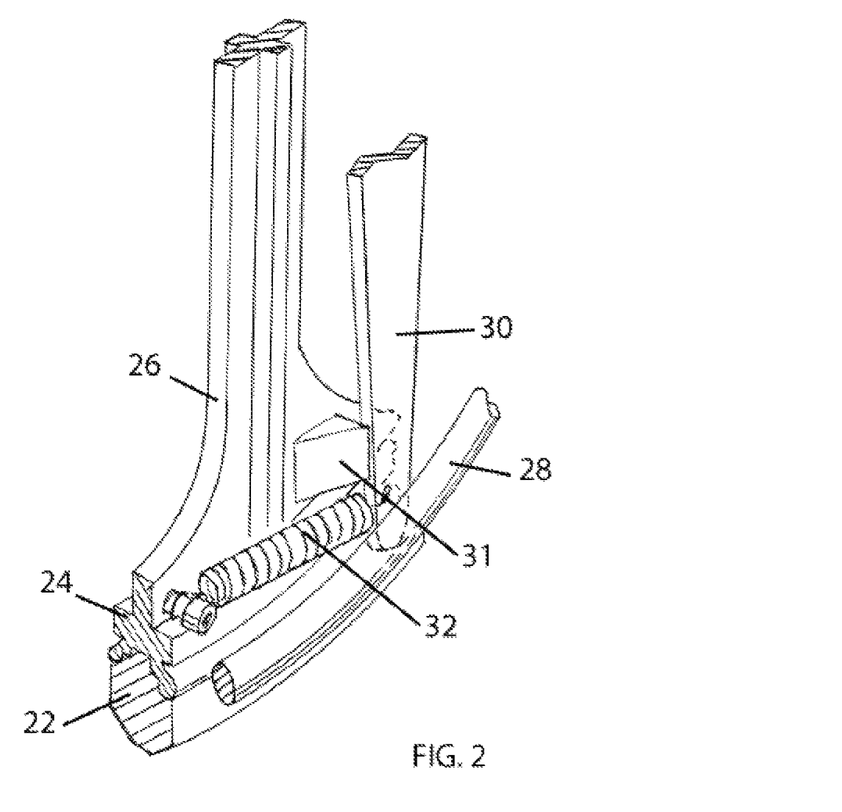
FIG. 2 is a partial perspective view of the drive wheel with a push ring.

The drive wheels 20 have a hub, generally indicated at 21, that is mounted for rotation in relation to the frame 16. A tire 22 is supported by a tire rim 24, which in turn is supported concentrically in relation to the hub 21 by spokes 26. A push rim 28 forms a part of a push ring 30, which is supported concentrically in fixed relation to the tire rim 24. The push rim 28 may be grasped by a wheelchair user (not shown) and urged forward to rotate the drive wheels 20 in a forward direction to propel the wheelchair 10 in a forward direction. Conversely, and the push rim 28 may be grasped by the wheelchair user and urged rearward to rotate the drive wheels 20 in a rearward direction to propel the wheelchair 10 in a rearward direction. Additionally, the push rim 28 may be grasped and rotated rearward independent of the drive wheel 20 to engage an in-hub brake system 34 (shown in FIG. 3) within the hub 21, as will become apparent in the description that follows. The push rim 28 and the push ring 30 return to a neutral position via a return spring 32 (shown in FIG. 2) when the wheelchair user releases the push rim 28.

Now with reference to FIGS. 3-6, an in-hub braking system, generally indicated at 34, will be described. The system 34 comprises a hub shell 36 that is fixed within the hub 21 of the drive wheel 20, as clearly shown in FIGS. 3-5. Brake pads 38 are mounted in relation to a cam stud 40 and a fixed stud 42, which are in turn affixed or supported in relation to a mounting plate 48 that is in turn affixed or supported in relation to the hub shell 36. The brake pads 38 may be held in relation to the studs 40, 42 by retaining clips 44, 45. A release spring 46 (shown in its entirety in FIG. 6) cooperates with the brake pads 38 to bias the brake pads 38 to a released or unbraked position, as will become apparent in the description that follows.

The cam stud 40 cooperates with an activation lever 50 (e.g., via mating geometry) and is affixed or supported in relation to the activation lever 50 via a nut 52, which is in threaded engagement with an end of the cam stud 40. The cam stud 40 is allowed to rotate in relation to the mounting plate 48 to activate the brake pads 38 against a braking surface 60 of a brake shell 62. As clearly shown in FIG. 3, the activation lever 50 is in turn affixed or supported in relation to the push ring 30 via a fastener 54 through a bearing plate 56. The bearing plate 56 is in turn affixed to the drive wheel 20 via a fastener 58 through the spokes 26. The bearing plate 56 allows for axial rotation of the push rim 28 and push ring 30 in relation to the spokes 26 of the drive wheel 20 to engage the in-hub braking system 34. The hub shell 36 rotates against a quick release axle pin 63 via bearings 64.

Figure 3:
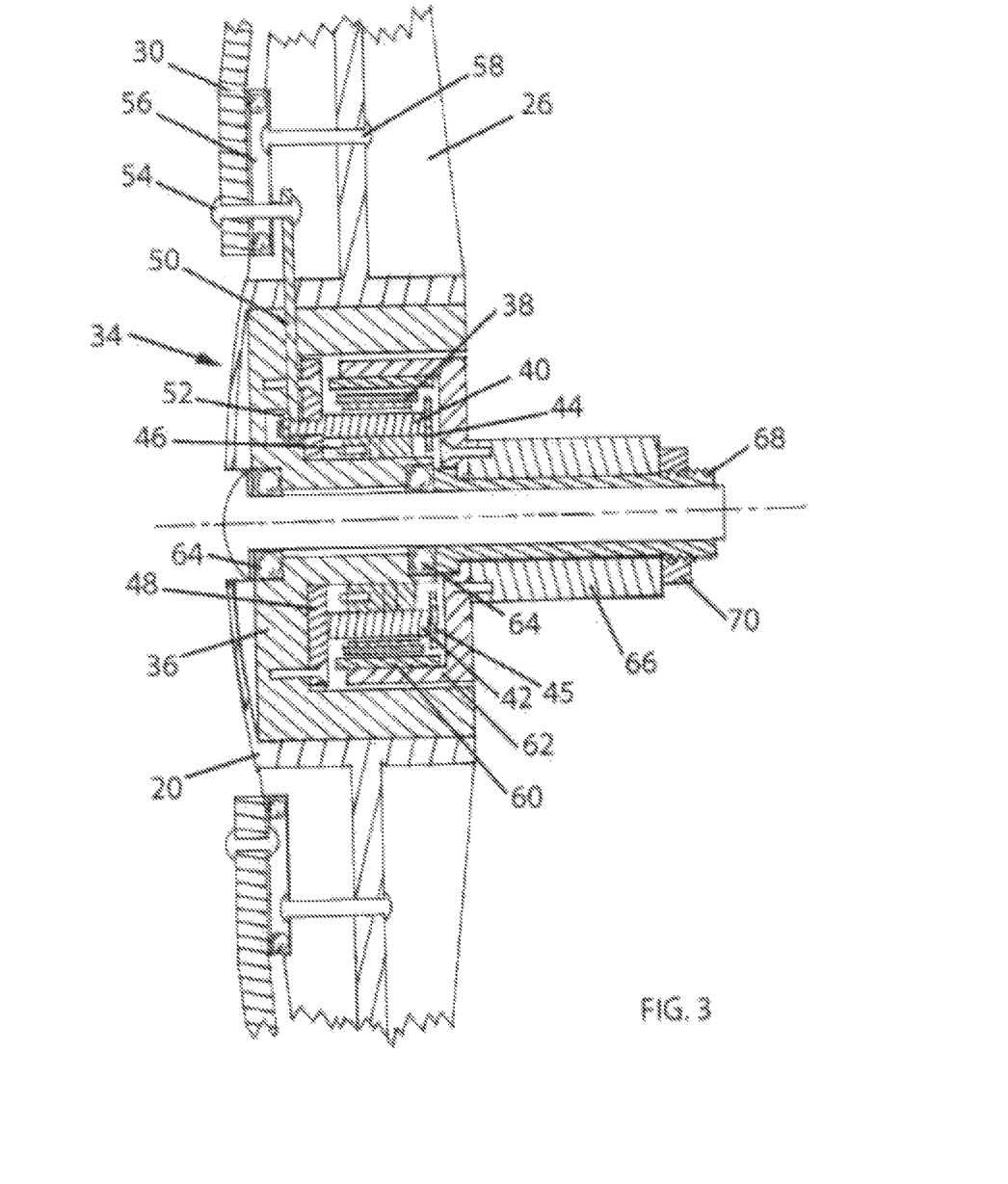
FIG. 3 is a cross-sectional view of a drive wheel hub having the braking system.
Figure 4:
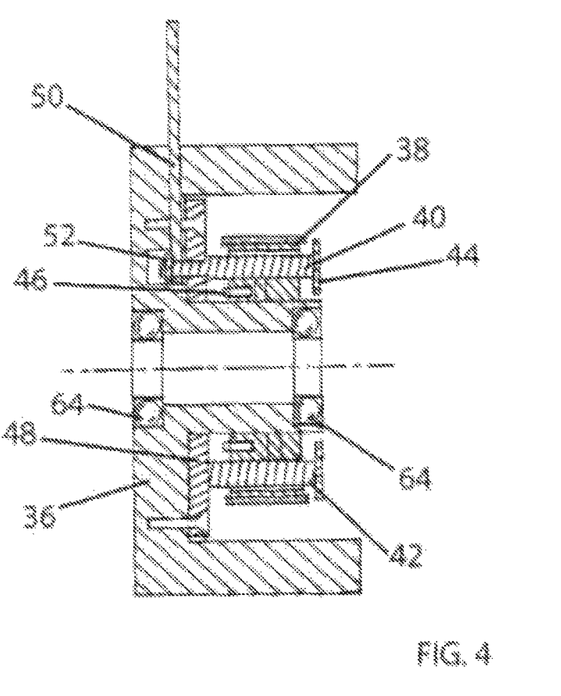
FIG. 4 is a cross-sectional view of a hub shell assembly.
Figure 5:
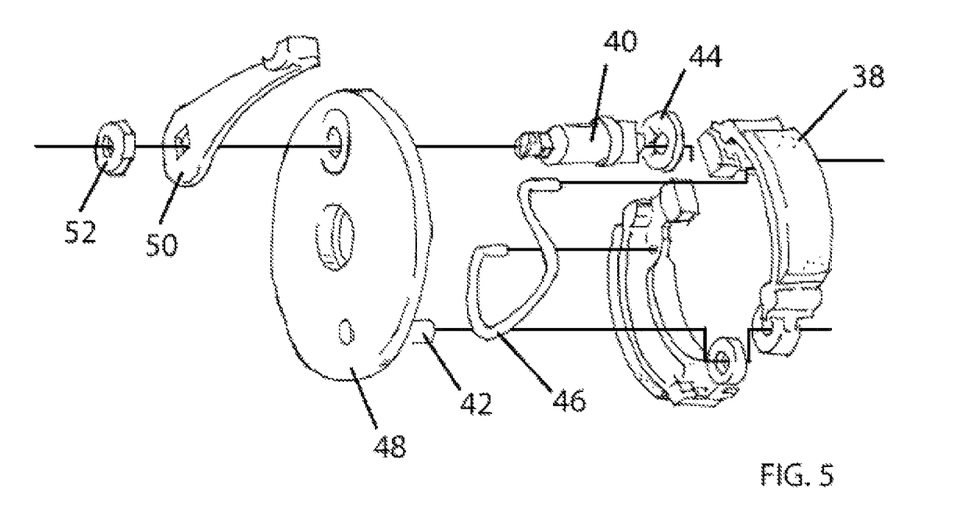
FIG. 5 is an exploded perspective view of braking system parts.
Figure 6:
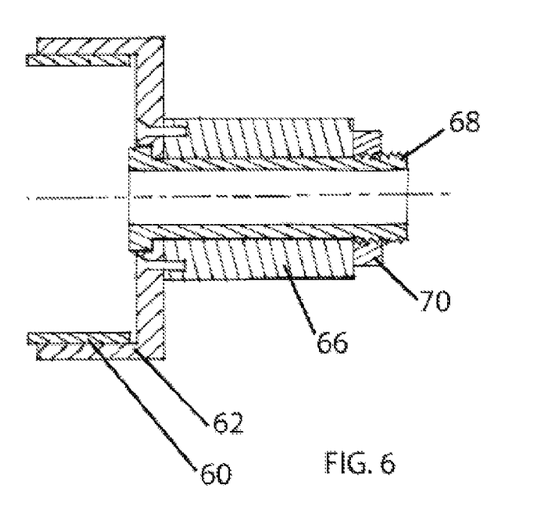
FIG. 6 is a cross-sectional view of a brake shell assembly.

As shown in FIGS. 3 and 6, the brake shell 62 contains the braking surface 60. The brake shell 62 may be affixed to a camber block 66. The camber block 66 may be mounted in relation to the frame 16 of the wheelchair 10 in a fixed manner as to not allow for rotation of the brake shell 62 in relation to the frame 16. For example, the camber block 66 may be mounted in relation to a camber tube (not shown), as is well known in the art, which may be mounted in a fixed manner in relation to the frame 16. It should be appreciated that the brake shell 62 may be mounted in a fixed manner in relation to an axle sleeve (not shown), as is well known in the art, so as to not allow for rotation of the brake shell 62 in relation to the frame 16.

A hollow axle housing 68 may be pressed into the union of brake shell 62 and camber block 66 and attached to the hollow axle housing 68 and the brake shell 62 via an axle nut 70. The drive wheel 20 supporting the braking system 34 is affixed or supported in relation to the brake shell 62 via the quick release axle pin 63 through the hollow axle housing 68.

Figure 7:
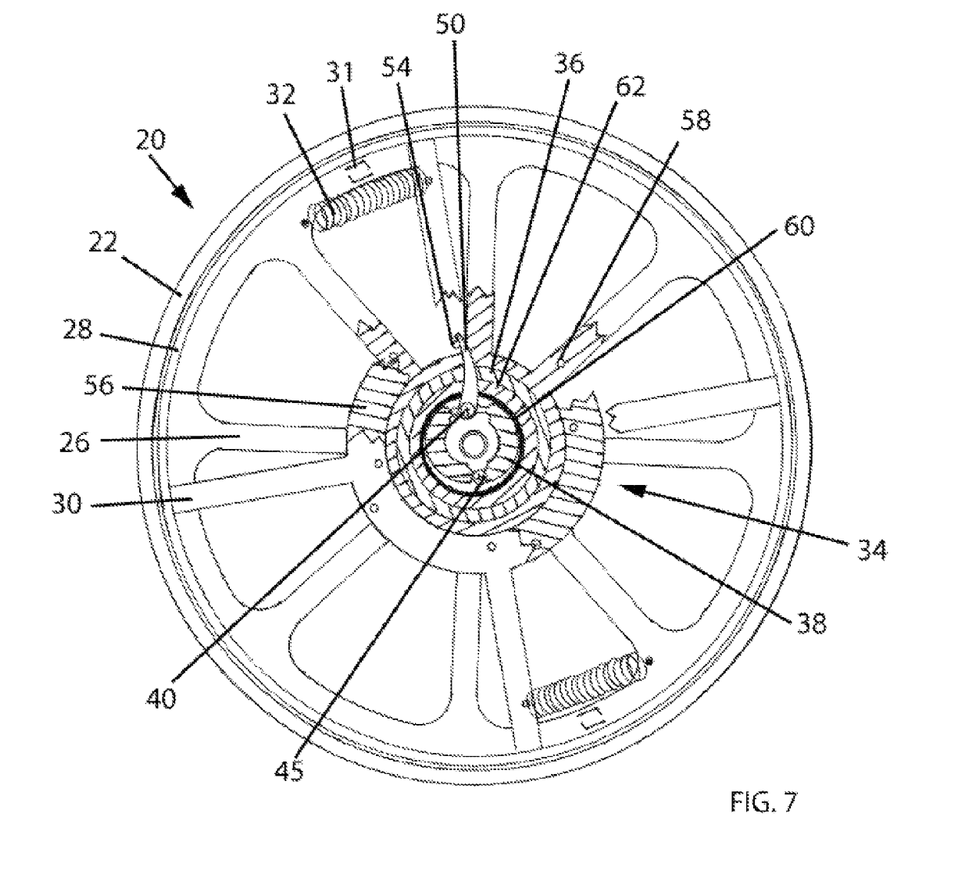
FIG. 7 is a partial cross-sectional plan view of the drive wheel with the braking system disengaged.
Figure 8:
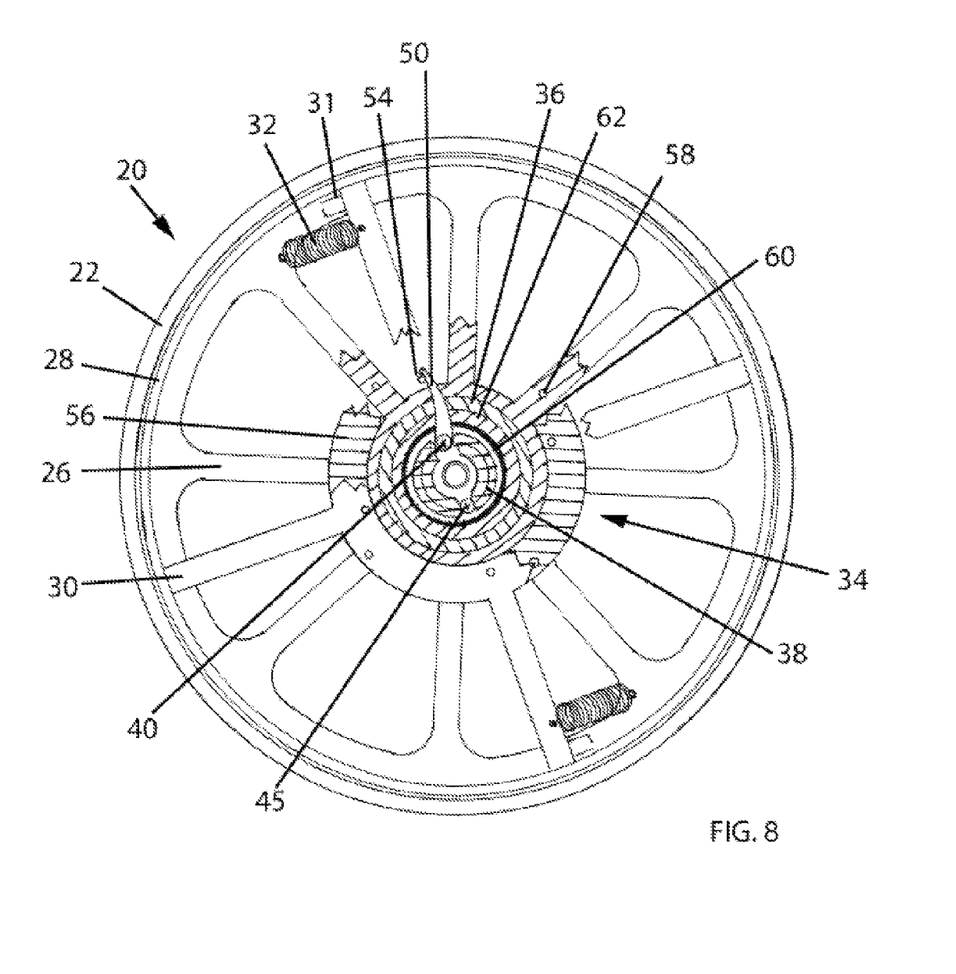
FIG. 8 is a partial cross-sectional plan view of the drive wheel with the braking system engaged.

In operation, by applying force to the push rim 28 in a rearward direction opposed to the forward rotation of the drive wheel 20, the push ring 30 and the bearing plate 56 rotate and engage the activation lever 50 (in a clockwise direction when viewing FIG. 7), which in turn rotates the cam stud 40 and expands the brake pads 38 into the inner circumference of the braking surface 60. This creates mechanical amplification of the direct force applied by the wheelchair user. Upon release of the push rim 28, the return spring 32 pulls the push ring 30 into a neutral position (in a counterclockwise direction when viewing FIG. 8) against a positive stop 31 (shown in FIG. 20, thus disengaging the activation lever 50 and releasing the brake pads 38 from the inner circumference of the braking surface 60.

Accordingly, the wheelchair 10 may use a quick release drive wheel 20, with brake pads 38 inside the hub 21. The brake pads 38 may interface with a braking surface 60 supported in relation to the frame 16 of the wheelchair 10, such as by a camber tube or an axle block (not shown). The drive wheels 20 may be machined and pressed from billet aluminum so as to be hollowed-out. A drum brake mechanism inside the drive wheel 20 may be activated by a floating push rim 28, which is mounted to a rotating bearing surface (e.g., via bearing plate 56) at the hub 21, with a return spring 32 supported in relation to the perimeter of the tire 22. The braking surface 60 may be supported in relation to the frame 16 of the wheelchair 10 so as to maintain standard camber and width.

The push rim 28 engages a positive stop 31 on the drive wheel 20 to normally propel the drive wheel 20 in a forward direction, effectively without being aware that the push rim 28 is not actually attached to the drive wheel 20. It is not until slowing the drive wheel 20 down that the push rim 28 articulates, with the braking system 34 engaging simply by applying friction to the push rim 28. Application of the brakes is akin to applying backwards pressure on the pedals of a coaster-brake equipped bicycle. The torque applied to the push rim 28 due to the forward momentum of the wheelchair overcomes the force of the return springs 32, and articulates backwards. There may be less than 1.18 inches (3 cm) of articulation to engage the brake pads 38 against the braking surface 60 and slow down the wheelchair 10. This movement may be virtually undetectable until the user comes to a complete stop and releases the push rim 28. At this point, the push rim 28 may return back to a neutral position to release the brake pads 38. Reversing in the wheelchair 10 is unaffected by the braking system 34, with the torque applied to the push rim 28 being less than the force of the return spring 32.

The braking system 34 allows a wheelchair user to quickly and easily maintain speed, slow down, and stop as desired. The braking system 34 allows users to maintain their hands on the drive wheels 20 in many different and challenging environments, including users with low-dexterity, to users with high-function.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An in-hub braking system for a wheelchair, the system comprising:
    a brake shell fixed against rotation movement in relation to a wheelchair frame;
    a wheelchair drive wheel having a hub supporting a braking system supported for rotational movement in relation to the brake shell;
    a lever operatively connected to the braking system for activating that braking system to cause the braking system to frictionally engage the brake shell; and
    a push rim, which when urged forward, rotates the drive wheel in a forward direction to propel the wheelchair in a forward direction, and when urged rearward together with the drive wheel, rotates with the drive wheel in a rearward direction to propel the wheelchair in a rearward direction, the push rim being operatively connected to the lever so that the push rim, which when urged rearward independent of the drive wheel, operates the lever to activate the braking system to frictionally engage the brake shell.

* * * * *